(12) United States Patent
Suzuki

(10) Patent No.: US 11,874,400 B2
(45) Date of Patent: Jan. 16, 2024

(54) LIDAR DEVICE, CRUISE ASSIST SYSTEM, AND VEHICLE

(71) Applicant: DENSO CORPORATION, Kariya (JP)

(72) Inventor: Shunpei Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 801 days.

(21) Appl. No.: 16/936,391

(22) Filed: Jul. 22, 2020

(65) Prior Publication Data

US 2020/0355805 A1 Nov. 12, 2020

Related U.S. Application Data

(63) Continuation of application No. PCT/JP2019/002096, filed on Jan. 23, 2019.

(30) Foreign Application Priority Data

Jan. 24, 2018 (JP) .................................. 2018-009657

(51) Int. Cl.
  *G01S 7/481* (2006.01)
  *G01S 7/497* (2006.01)
  *G01S 17/931* (2020.01)

(52) U.S. Cl.
  CPC ........... *G01S 7/4817* (2013.01); *G01S 7/4811* (2013.01); *G01S 7/4972* (2013.01); *G01S 17/931* (2020.01)

(58) Field of Classification Search
  CPC .... G01S 7/4817; G01S 7/4811; G01S 7/4972; G01S 17/931
  See application file for complete search history.

(56) References Cited

U.S. PATENT DOCUMENTS

| | | | | |
|---|---|---|---|---|
| 5,253,033 A * | 10/1993 | Lipchak | ................... | G01S 7/499 349/1 |
| 5,793,491 A * | 8/1998 | Wangler | ................... | G01S 17/89 356/613 |
| 5,864,391 A * | 1/1999 | Hosokawa | ............... | G01S 17/04 356/5.01 |
| 6,317,202 B1 * | 11/2001 | Hosokawa | ............... | G01S 17/42 180/169 |
| 8,773,644 B2 * | 7/2014 | Suzuki | .................... | G02B 26/12 356/9 |
| 9,086,273 B1 | 7/2015 | Gruver et al. | | |
| 9,239,959 B1 * | 1/2016 | Evans | ..................... | G01S 17/89 |

(Continued)

*Primary Examiner* — Yuqing Xiao
*Assistant Examiner* — Brian Zawacki
(74) *Attorney, Agent, or Firm* — MASCHOFF BRENNAN

(57) ABSTRACT

A scanner has a rotational axis and reflection surfaces. The scanner rotates the reflection surfaces about the rotational axis. The reflection surfaces are parallel to a direction of the rotational axis. The scanner changes a direction of each of the light beams transmitted from the phototransmitter and incident on the scanner to thereby output changed light beams in a main scanning direction that is orthogonal to the direction of the rotational axis. The scanner reflects light beams arriving from a target object based on reflection of the changed light beams to thereby cause the light beams to be directed toward the receiver. The first and second light sources are arranged such that the optical axis of at least one of the light beams transmitted from the first and second light sources is obliquely inclined with respect to a reference plane that is orthogonal to the rotational axis.

13 Claims, 14 Drawing Sheets

(56) References Cited

U.S. PATENT DOCUMENTS

| | | | | |
|---|---|---|---|---|
| 9,970,955 B1* | 5/2018 | Homyk | ............... | A61B 5/0261 |
| 9,981,604 B2* | 5/2018 | Sakai | ..................... | B60Q 9/008 |
| 2012/0249996 A1* | 10/2012 | Tanaka | ................... | G01S 17/42 |
| | | | | 356/4.01 |
| 2013/0229645 A1 | 9/2013 | Suzuki et al. | | |
| 2015/0062555 A1* | 3/2015 | Kim | ....................... | G01S 17/87 |
| | | | | 356/4.01 |
| 2016/0274223 A1 | 9/2016 | Imai | | |

* cited by examiner

ROTATIONAL AXIS

LIDAR DEVICE, CRUISE ASSIST SYSTEM, AND VEHICLE

CROSS REFERENCE TO RELATED APPLICATION

The present application claims the benefit of priority from Japanese Patent Application No. 2018-009657 filed on Jan. 24, 2018, the entire disclosure of which is incorporated herein by reference.

TECHNICAL FIELD

The present disclosure relates to a lidar device including a light deflector, a cruise assist system using such a lidar device, and a vehicle using such a lidar device.

BACKGROUND

Lidar devices may include a deflection mirror used as a light deflection device which is rotated to deflect light for scanning. The term "lidar" is also written as "LIDAR", which is an acronym for Light Detection and Ranging.

SUMMARY

An exemplary aspect of the present disclosure provides a lidar device including a phototransmitter, a photoreceiver, and a scanner.

The phototransmitter includes at least first and second light sources. The first and second light sources are arranged such that an optical axis of at least one of light beams transmitted from the first and second light sources is obliquely inclined with respect to a reference plane that is orthogonal to a rotational axis of the scanner.

BRIEF DESCRIPTION OF THE DRAWINGS

The object described above, other objects, features, and advantages of the present disclosure will become apparent from the following description of embodiments with reference to the accompanying drawings in which.

DESCRIPTION OF EMBODIMENTS

Viewpoint

Figure 1:
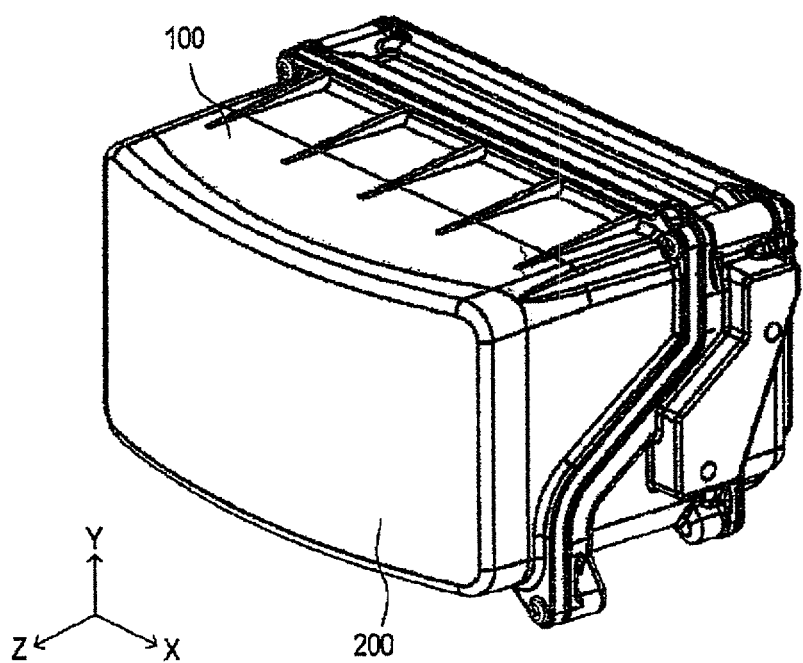
FIG. 1 is a perspective view of a lidar device.

Such a lidar device is configured to change an incident angle of light incident on a rotating deflection mirror to thereby change an output angle of light outputted from the deflection mirror in a horizontal plane perpendicular to a rotational axis of the deflection mirror.

Another type of a lidar device is configured to perform two-dimensional light scanning using at least first and second deflection mirrors. Each of the first and second deflection mirrors has a rotational axis and a deflection surface being obliquely inclined with respect to the rotational axis at a predetermined inclination angle; the inclination angle of the first deflection mirror is different from the inclination angle of the second deflection mirror.

Specifically, the lidar device, which performs two-dimensional light scanning, is configured to change an output angle of light outputted from each of the first and second deflection mirrors in a vertical plane perpendicular to the horizontal plane, thus two-dimensionally scanning the outputted light.

Change of the incident angle of light, such as laser light, incident on each deflection mirror with its deflection surface being obliquely inclined with respect to its rotational axis may cause an output angle of laser light from the corresponding deflection mirror in the vertical plane to be changed depending on the rotational position of the corresponding deflection mirror. This may result in one or more dead zones in a two-dimensional scanning area defined by a main scanning direction along the horizontal plane and a sub scanning direction along the vertical plane; the one or more dead zones each represent a zone in the two-dimensional scanning area that is irradiated with no laser light, i.e. a zone where no object is detected.

From this viewpoint, Japanese Patent Publication No. 6025014 discloses a technology that devises the shape of the deflection surface of each deflection mirror to thereby reduce a deviation of laser light deflected by each deflection mirror from a designed location.

The disclosing persons however have discovered the following problems with the conventional technique disclosed in the conventional technology disclosed in the published patent document as a result of detailed consideration of the conventional technology.

The deflection surface of each deflection mirror may have a non-planar shape, resulting in higher difficulty in designing and manufacturing the deflection mirrors. The deflection surface of each deflection mirror may also have a non-uniform shape, resulting in a burden of precise adjustment of the position of light incident on the deflection surface of each deflection mirror. Misalignment of a deflection mirror in the above lidar device may deteriorate the detection accuracy of the lidar device, resulting in frequent readjustment works of the deflection mirrors being required for maintaining the detection accuracy of the lidar device.

One aspect of the present disclosure provides lidar devices, each of which has a simpler configuration that is more easily adjustable.

A lidar device according to a first exemplary aspect of the present disclosure includes a phototransmitter, a photoreceiver, and a scanner.

The phototransmitter includes at least first and second light sources, each of the first and second light sources being configured to transmit a light beam having an optical axis. Each of the at least first and second light sources can include one or more optical devices, such as lenses or mirrors. The photoreceiver is configured to receive light arriving from a predetermined direction. The scanner has a rotational axis and a plurality of reflection surfaces that are parallel to a direction of the rotational axis. The scanner is configured to rotate the reflection surfaces about the rotational axis to thereby (1) Change a direction of each of the light beams transmitted from the phototransmitter and incident on the scanner to thereby output changed light beams in a main scanning direction that is orthogonal to the direction of the rotational axis (2) Reflect light beams arriving from a target object based on reflection of the changed light beams to thereby cause the light beams to be directed toward the photoreceiver The first and second light sources are arranged such that the optical axis of at least one of the light beams transmitted from the first and second light sources is obliquely inclined with respect to a reference plane that is orthogonal to the rotational axis.

A cruise assist system according to a second exemplary aspect of the present disclosure includes the lidar device.

A vehicle according to a third exemplary aspect of the present disclosure includes the lidar device.

Because the reflection surfaces are arranged to be parallel to the direction of the rotational axis, the lidar device maintains the output angle of each light beam in a plane including the incident path of the light beams and the rotational axis to be constant. In other words, the lidar device keeps unchanged the output angle of each of the light beams in the sub scanning direction independently of the output angle of the corresponding one of the light beams in a main scanning direction. This prevents one or more dead zones from being produced in the two-dimensional scanning area; the one or more dead zones each represent a zone that is irradiated with no laser light. The lidar device makes it easier to achieve the above advantageous effect without the reflection surfaces being complicated.

Embodiments

The following describes an exemplary embodiment of the present disclosure with reference to the drawings.

[1. Configuration]

Figure 17:
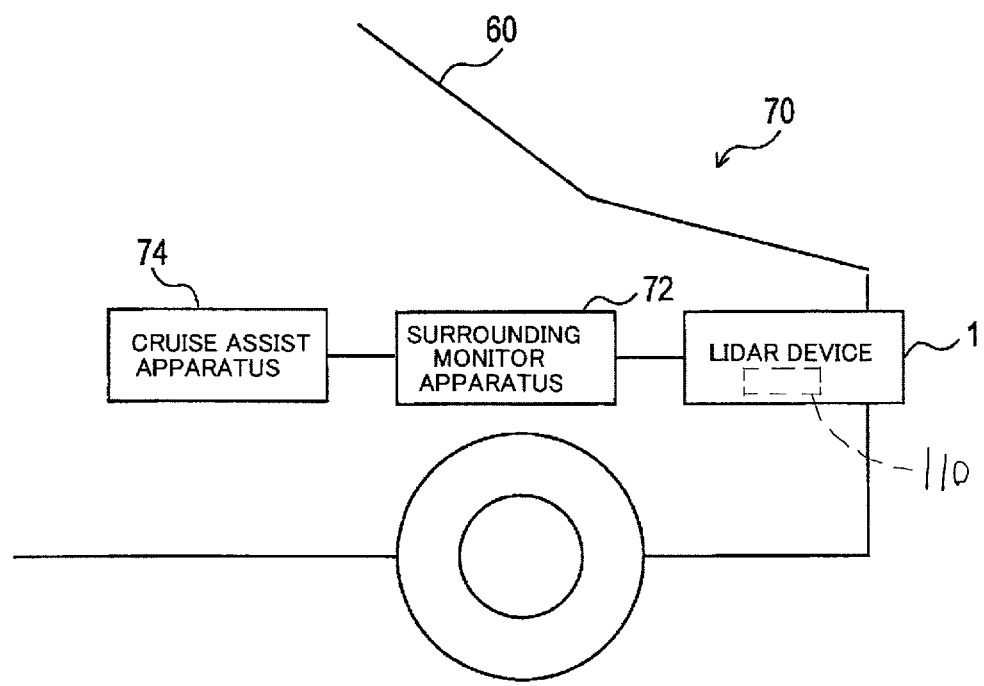
FIG. 17 is a block diagram illustrating a cruise assist system.

FIG. 17 illustrates a driving system 70 installable in a vehicle 60. The driving system 70 includes a lidar device 1, a surrounding monitor apparatus 72, and a cruise assist apparatus 74.

The lidar device 1 is mounted in, for example, the compartment of the vehicle 60. The lidar device 1 is configured to transmit light to the surrounding of the vehicle 60, and receive light from the surrounding to thereby detect various objects around the vehicle 60. The term "lidar" is also written as "LIDAR", which is an acronym for Light Detection and Ranging. The lidar device 1 is not limited to be installed in the compartment of the vehicle 60, and can be mounted to the body of the vehicle 60, at least part of which is exposed from the body of the vehicle 60.

The surrounding monitor apparatus 72 is configured to generate, based on measurements obtained by lidar device 1, surrounding information that enables the situations around the vehicle 60 to be monitored. The surrounding monitor apparatus 72 can be configured to generate, in addition to the measurements obtained by the lidar device 1, surrounding information in accordance with measurements obtained by at least one of one or more cameras, one or more millimeter-wave radars, sonars, these cameras, radars, and sonars are installed to the vehicle 60.

The cruise assist apparatus 74 is configured to perform control of operations of the vehicle 60 in accordance with the surrounding information generated by the surrounding monitor apparatus 72 and vehicle state/behavior information measured by various sensors installed in the vehicle 60; the vehicle state/behavior information represents at least one of the state of the vehicle 60 and the behavior of the vehicle 60. This control of operations of the vehicle 60 enables various assist tasks of the cruising of the vehicle 60 to be carried out. The various assist tasks carried out by the cruise assist apparatus 74 include, for example, a following distance control task, in other words, an auto cruise control (ACC) task, a lane keeping assist (LKA) task, a lane change assist task, a lane departure warning task, an overtaking assist task, an intervention assist task, an automatic braking task, and an autonomous driving task.

As illustrated in FIG. 1, the lidar device 1 includes a housing 100 and an optical window 200.

The housing 100 is a rectangular-parallelepiped resin casing. The casing has a substantially rectangular side which has an opening. The housing 100 has a light detection module 2 (described later) disposed therein.

The optical window 200 is a resin lid fixed to the housing 100 so as to close the opening thereof. The optical window 200 enables laser light transmitted from the light detection module 2 inside the housing 100 to pass therethrough.

In the following description, an X-axis direction is defined as extending along a longer side of the substantially rectangular opening of the housing 100; a Y-axis direction is defined as extending along a shorter side of the opening; and a Z-axis direction is defined as extending orthogonal to the X-Y plane.

Note that the X-axis direction has a left side and a right side when viewed from a point that faces the opening of the housing 100, and the Y-axis direction has an upper side and a lower side when viewed from a point that faces the opening of the housing 100. A side of the opening of the housing 100 is defined as a front side, and a side of the housing 100, which is opposite to the side of the opening, is defined as a rear side. The Z-axis direction has a front side and a rear side that respectively refer to the front side of the housing 100 and the rear side thereof.

Figure 2:
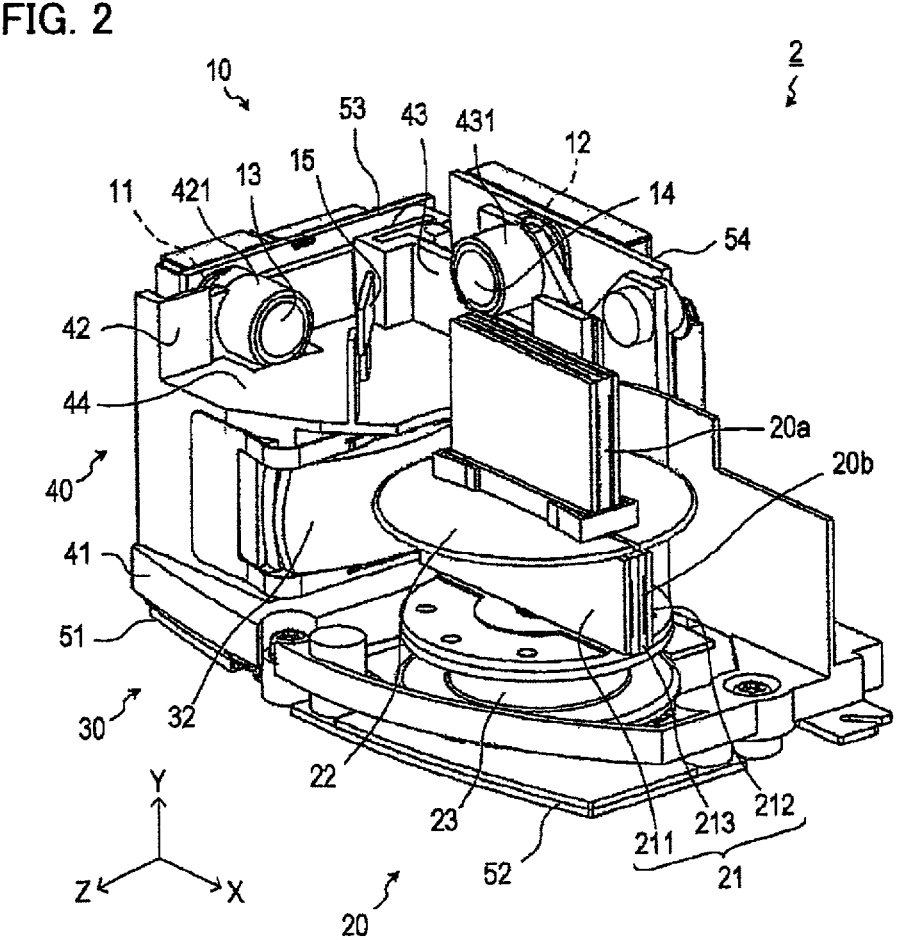
FIG. 2 is a perspective view of the lidar device, illustrating the structure of a light detection module disposed in a housing of the device.
Figure 3:
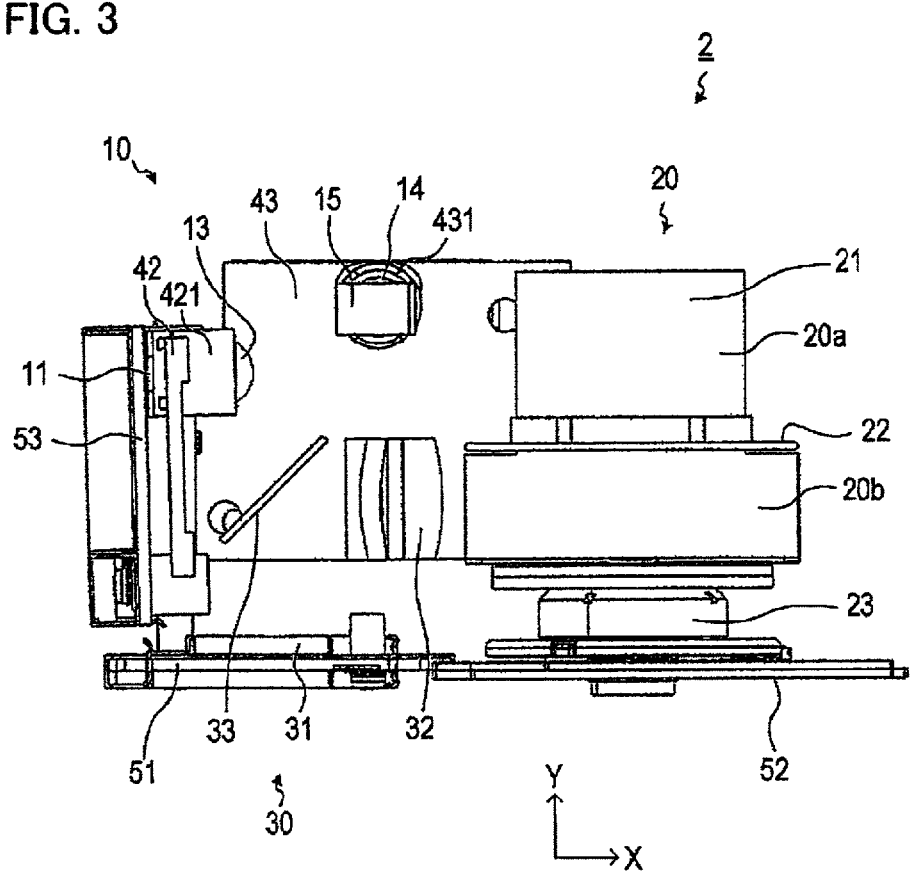
FIG. 3 is a front view of the light detection module having its components integrally installed in a frame partially illustrated.
Figure 4:
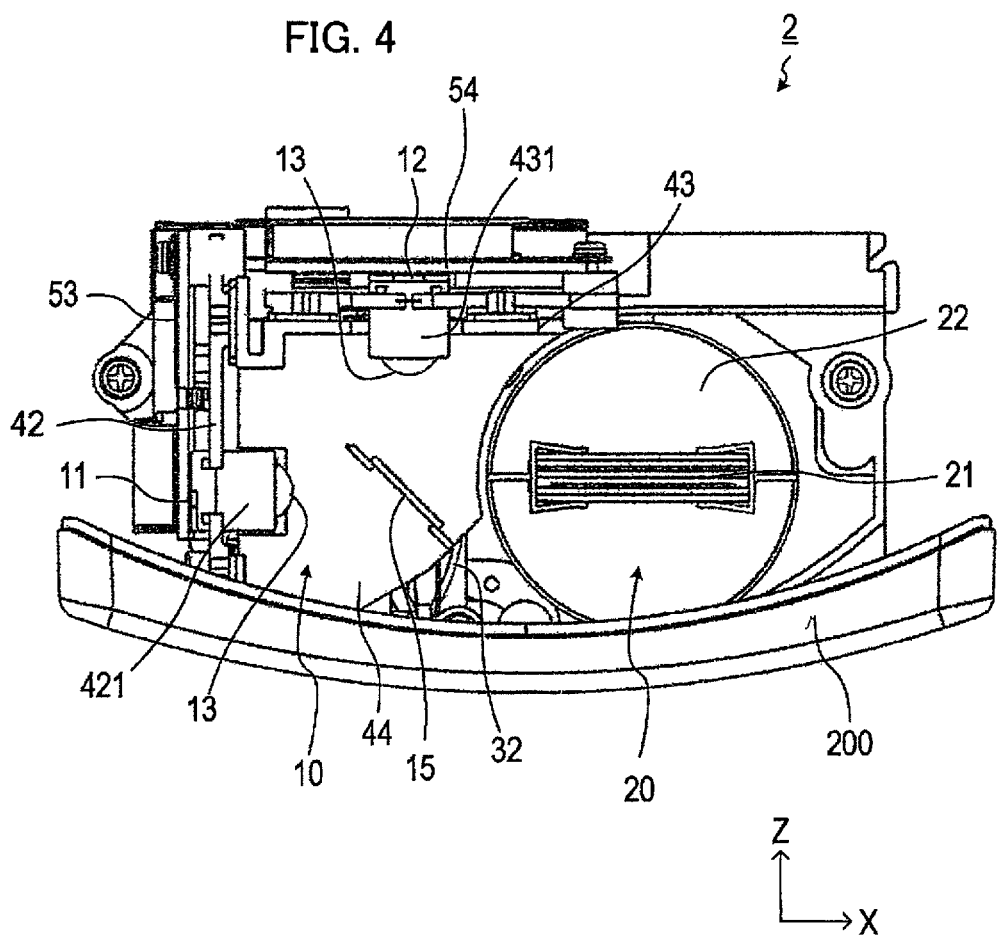
FIG. 4 is a plan view of the lidar device, with the housing omitted.

As illustrated in FIGS. 2 to 4, the light detection module 2 includes a phototransmitter 10, a scanner 20, and a photoreceiver 30. The light detection module 2 is mounted to the housing 100 via a frame 40.

[1-1. Scanner]

The scanner 20 includes a mirror module 21, a partition plate 22, and a motor 23.

Figure 5:
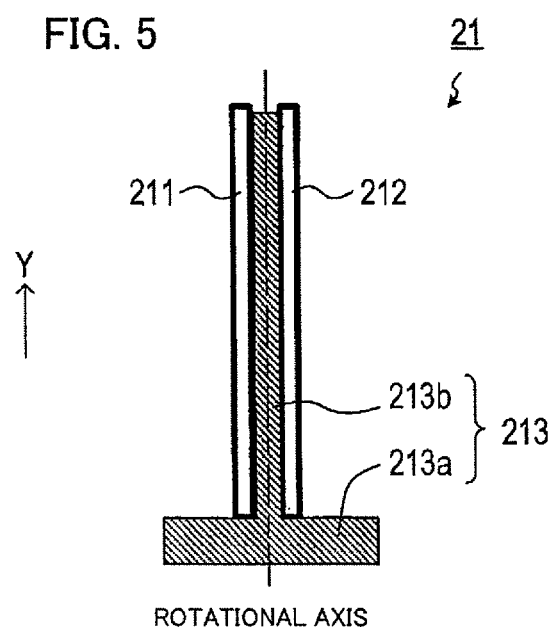
FIG. 5 is an explanatory cross-sectional view illustrating a structure of a mirror module.

The mirror module 21, as illustrated in FIG. 5, includes a pair of deflection mirrors 211 and 212, and a mirror frame 213.

Each of the deflection mirrors 211 and 212 is a flat plate member having a reflective surface that can reflect light. The mirror frame 213 includes a disk member 213a and a mount member 213b. The disk member 213a is shaped like a circular flat plate, and has a center portion fastened to a rotational shaft of the motor 23.

The mount member 213b, which is a plate-like shape, has both opposite major surfaces to which the deflection mirrors 211 and 212 are respectively fixed. The mount member 213b is disposed vertically on the disk member 213a.

Each of the first and second deflection mirrors 211 and 212 and the mount member 213b has a combined shape of two rectangles each having opposing longer sides. The length of the longer side of one of the two rectangles is different from the length of the longer side of the other thereof.

Specifically, the two rectangles, each of which has opposing shorter sides, are combined together such that their central axes, each of which is parallel with the shorter sides, are aligned with each other.

As described above, the first and second deflection mirrors 211 and 212 and the mount member 213b, each of which is shaped as the combination of the two rectangles, are integrated with each other to constitute a mirror assembly comprised of a narrower-width rectangular portion and a wider-width rectangular portion. The narrower-width rectangular portion has a narrower width in its longitudinal direction, and the wider-width rectangular portion has a wider width in its longitudinal direction.

The first and second deflection mirrors 211 and 212, which are combined with each other via the mirror frame 213, are located such that (i) the wider-width rectangular portion is lower than the narrower-width rectangular portion, and (ii) the central axis of the mirror assembly of the combined first and second deflection mirrors 211 and 212 is aligned with the center of the disk-like member 213a. Rotatably driving the motor 23 therefore allows the mirror assembly of the combined first and second deflection mirrors 211 and 212 to rotate about the rotating shaft of the motor 23.

That is, the mirror module 21 is configured to rotate around the central axis of the mirror frame 213. The reflective surfaces of the first and second deflection mirrors 211 and 212 are parallel to the rotational shaft of the motor 23 independently of the rotational position of the motor 23.

The partition plate 22 is a circular plate-like member whose diameter is the same as the length of the wider-width portion in the longitudinal direction thereof. The partition plate 22 is partitioned into two semicircular portions. The partitioning plate 22 is fastened to the mirror module 21 while the semi-circular portions
1. Sandwich the narrower-width rectangular portion of the mirror module 21 from both major sides of the narrower-width rectangular portion
2. Abut on shoulders of the wider-width rectangular portion of the mirror module 21

Each of the first and second deflection mirrors 211 and 212 is comprised of
1. An upper portion located above the partition plate 22 and constituting the narrower-width rectangular portion of the mirror assembly
2. A lower portion located below the partition plate 22 and constituting the wider-width rectangular portion of the mirror assembly The upper portion of each of the first and second deflection mirrors 211 and 212 will be referred to as a transmitted-light deflector 20a, and the lower portion of each of the first and second deflection mirrors 211 and 212 will be referred to as a received-light deflector 20b.

[1-2. Light Emitter]

As illustrated in FIGS. 2 to 4, the phototransmitter 10 includes a pair of light sources 11 and 12. The phototransmitter 10 may also include a pair of photo transmission lenses 13 and 14 and a transmitted-light deflection mirror 15.

Because the light sources 11 and 12 have the same configuration, the following only describes the configuration of the light source 11 for the sake of simplicity.

Figure 6:
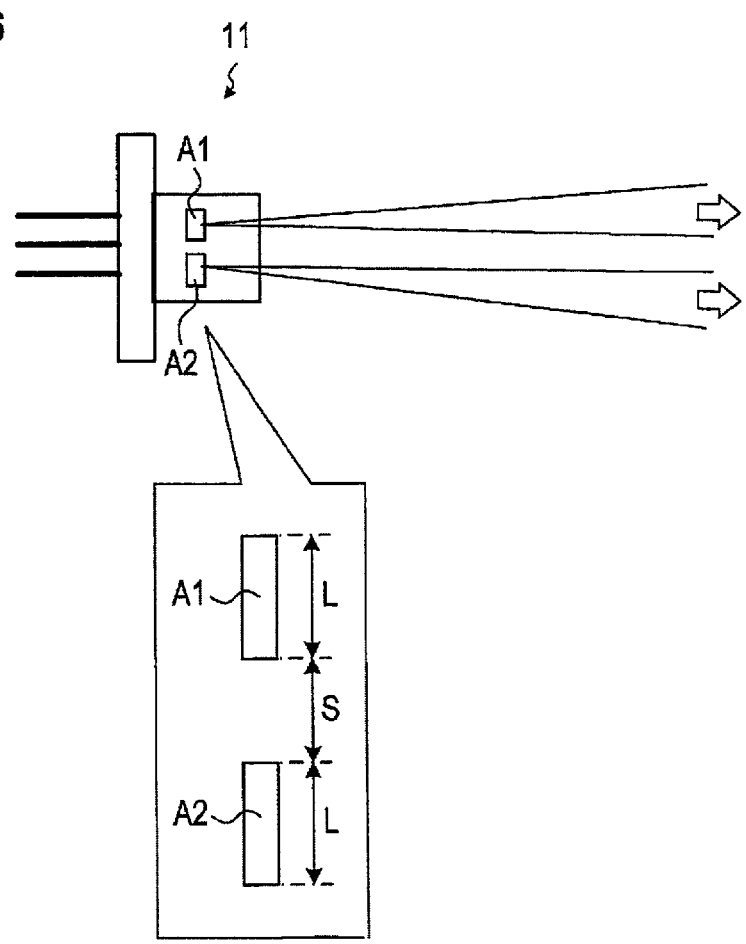
FIG. 6 is a view illustrating a structure of a light source.

Referring to FIG. 6, the light source 11 is designed as a multistrip semiconductor laser that includes at least two light emitting areas A1 and A2. The light emitting areas A1 and A2 are aligned in a predetermined direction that is defined as an alignment direction, and each of the light emitting areas A1 and A2 has a substantially rectangular shape whose longitudinal side extends in the alignment direction. Each of the light emitting areas A1 and A2 has an area width L in the alignment direction, and the light emitting areas A1 and A2 have an interval S therebetween. The light emitting areas A1 and A2 are arranged to enable the area width L and the interval S to satisfy the following relation L≥S.

The light emitting areas A1 and A2 are configured to emit light beams that have light exes parallel to each other, respectively. That is, the light beams emitted from the respective light emitting areas A1 and A2 also serve as transmission beams.

In the following description, the transmitted-light deflector 20a has opposing surfaces, and has, on each of the opposing surfaces, a reflection spot on which a light beam from each of the light sources 11 and 12 is incident. Each of the opposing surfaces of the transmitted-light deflector 20a is defined as a reference surface including the reflection spot and orthogonal to the rotational axis of the mirror module 21.

The light source 11, which has a light emitting surface of each light emitting area thereof, is located away from the reflection spot in the left side of the X-axis direction, with their light emission surfaces facing the transmitted-light reflector 20a.

The light source 12, which has a light emission surface of each light emitting area thereof, is located away from a corresponding deflection spot in the direction toward the rear side of the Z-axis direction, with their light emission surfaces facing toward the front side of the Z-axis direction; the deflection spot is located in a center region of a predetermined light-beam path between the reflection spot and the light source 11.

The light source 11 has a first vertical position in the vertical direction (i.e., the Y-axis direction), and the light source 12 has a second vertical position in the vertical direction, i.e. the Y-axis direction. The first vertical position of the light source 11 is arranged to be lower than the reference surfaces of the transmitted-light reflector 20a in the Y-axis direction, and the second vertical position of the light source 12 is arranged to be higher than the reference surfaces of the transmitted-light reflector 20a. The light sources 11 and 12 are arranged with the alignment direction of the light sources 11 and 12 matching the Y-axis direction.

The light transmission lens 13 is arranged to face the light emission surfaces of the light source 11. Similarly, the light transmission lens 14 is arranged to face the light emission surfaces of the light source 12. The light sources 11 and 12 are located near the focal points of the light transmission lenses 13 and 14, respectively.

The transmitted-light deflection mirror 15 is disposed at the deflection spots, and configured to deflect light beams, which have been transmitted from the light source 12 and passed through the light transmission lens 14, to thereby guide each of the deflected light beams to the corresponding reflection spot. In FIG. 5, the transmitted-light deflection mirror 15 is omitted.

Figure 8:
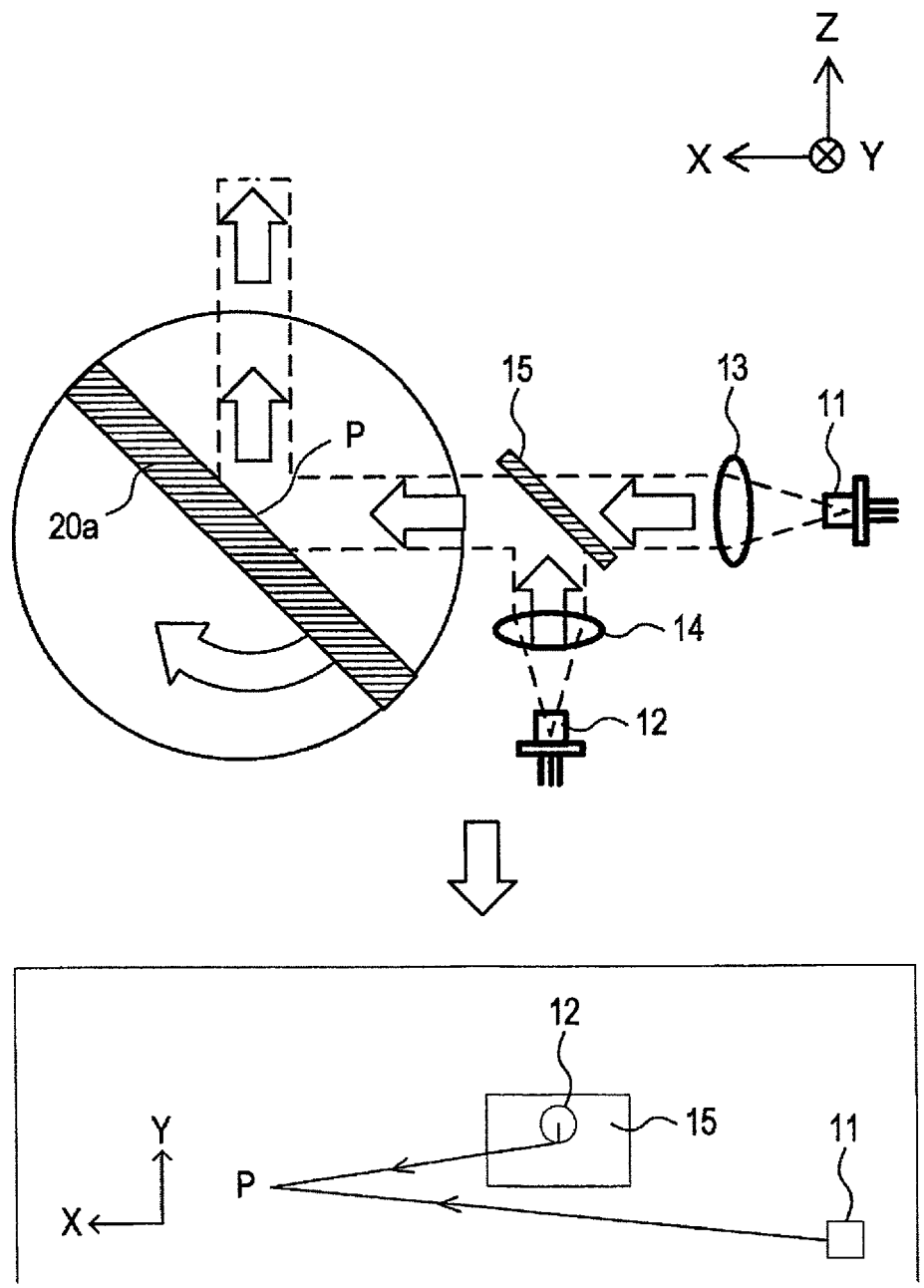
FIG. 8 is a diagram illustrating the path of light being transmitted and the arrangement of a transmitted light deflection mirror relative to the path of light.

The transmitted-light deflection mirror 15, as illustrated in FIG. 8, is arranged above the path of each light beam transmitted from the light source 11, passed through the light transmission lens 13, and traveling toward the corresponding reflection spot. This arrangement of the transmitted-light deflection mirror 15 prevents the transmitted-light deflection mirror 15 from obstructing the path of each light beam. The path of each light beam from the light source 11 to the reflection spot has the same length as the path of each light beam from the light source 12 through the transmitted-light deflection mirror 15 to the corresponding reflection spot.

In particular, each of the light sources 11 and 12 is configured such that the optical axes of the light emitting areas are each inclined upward by a predetermined angle with respect to the reference surfaces; the predetermined angle is selectively set within the range from 1 degrees to 2 degrees. The predetermined angle is not limited to be within the range from 1 degrees to 2 degrees. Specifically, the angle of each of the light sources 11 and 12 can be preferably set in accordance with a light beam irradiating angle required for a sub scanning direction.

[1-3. Photoreceiver]

The photoreceiver 30 includes a light reception device 31. The photoreceiver 30 may also include a light reception lens 32 and a received light deflection mirror 33.

Figure 7:
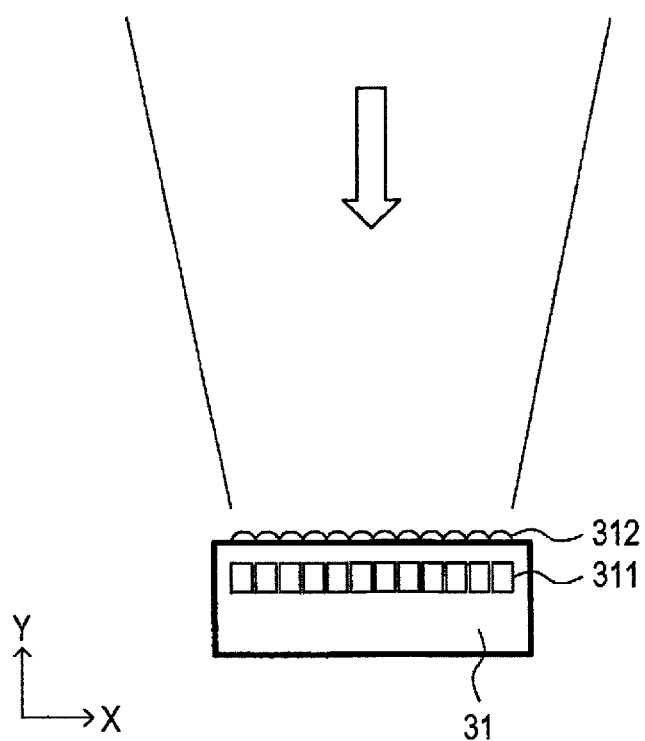
FIG. 7 is a view illustrating a structure of a light reception device.

As shown in FIG. 7, the light reception device 31 includes an APD array 311 and a lens array 312. The APD array 311 is comprised of twelve APDs arranged in a line. The "APD" refers to an avalanche photodiode. The lens array 312 is comprised of twelve lenses that are arranged to face the respective APDs of the APD array 311. Each of the lenses of the lens array 312 is configured to focus a light beam incident on the light reception device 31 onto the corresponding one of the APDs.

Figure 9:
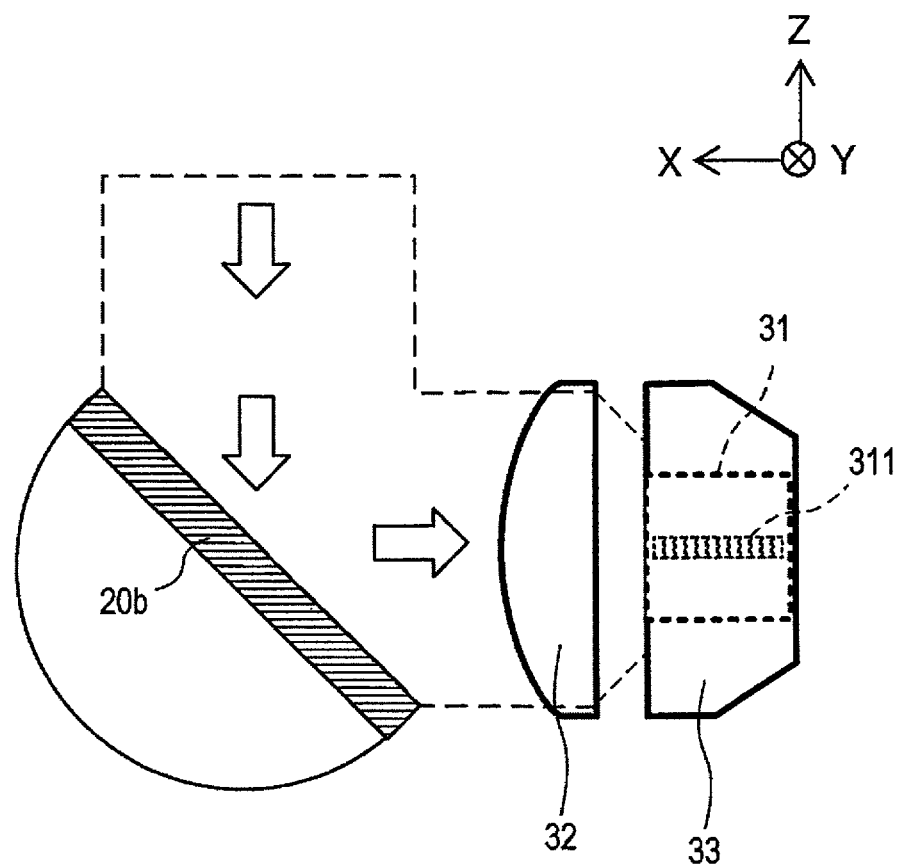
FIG. 9 is a diagram illustrating the path of a light beam being received.

As illustrated in FIGS. 3 and 9, the light reception device 31 is located beneath the received light deflection mirror 33 such that
1. A light reception surface of each of the APDs faces upward along the Y-axis direction
2. The APDs of the APD array 311 are arranged in the X-axis direction In FIG. 3, part of the frame 40 is omitted to clearly illustrate the arrangement of the components of the photoreceiver 30.

The received light deflection mirror 33 is located on the left side of the X-axis direction relative to the received-light deflector 20b. The received light deflection mirror 33 is arranged to deflect light beams, each of which is incident thereon through the photo reception lens 32, downward by a substantially right angle with respect to the Y-axis direction, thus causing each deflected light to reach the light reception device 31.

The light reception lens 32 is disposed between the received-light deflector 20b and the received-light deflection mirror 33. The received light lens 32 has a predetermined aperture that enables each light beam, which has passed through the aperture of the received light lens 32 so as to enter the light reception device 31, to have a reduced width in the Z-axis direction; the reduced width of the corresponding light beam in the Z-axis direction is on the order of the width of the APD in the Z-axis direction.

[1-4. Frame]

The frame 40 is configured to combine the components of the phototransmitter 10, scanner 20, and photoreceiver 30 together, and mount the combined components to the inside of the housing 100 while these components are fixedly arranged at predetermined respective positions in the housing 100.

As shown in FIGS. 2 to 4, the frame 40 includes a lower section 41, a side section 42, and a rear section 43 thereof. The frame 40 also includes a partition section 44.

A light reception board 51 has a mount surface on which the photoreceiver 30 is mounted, and a motor board 52 has a mount surface on which the motor 23 is mounted. The light reception board 51 and the motor board 52 are attached to a bottom of the frame lower section 41.

The frame lower section 41 has formed therethrough a first hole through which light from the received light deflection mirror 33 to the light reception device 31 travels. The frame lower section 41 also has formed therethrough a second hole through which the motor 23 of the scanner 20 is disposed.

The frame side section 42 has opposing front and rear surfaces, and is arranged such that the front surface faces the scanner 20. A cylindrical holder 421 projects from the front surface of the frame side section 42. The cylindrical holder 421 has a cylindrical opening with opposing front and rear ends, i.e. opposing right-side and left-side ends in the X-axis direction. The light transmission lens 13 is fitted in the front end of the cylindrical opening of the cylindrical holder 421.

A light emission board 53, to which the light source 11 has been assembled, is mounted to the rear surface of the frame side section 42. With the light emission board 53 mounted to the frame side section 42, the light source 11 is located at the rear end of the cylindrical opening of the cylindrical holder 421, i.e. the left end of the cylindrical opening of the cylindrical holder 421 in the X-axis direction.

As with the frame side section 42, a cylindrical holder 431 projects from a front surface of the frame rear section 43. The cylindrical holder 431 has a cylindrical opening with opposing front and rear ends, i.e. opposing right-side and left-side ends in the X-axis direction. The light transmission lens 13 is fitted in the front end of the cylindrical opening of the cylindrical holder 431.

A light emission board 54, to which the light source 12 has been assembled, is mounted to the rear surface of the frame rear section 43. With the light emission board 5 mounted to the frame rear section 43, the light source 12 is located at the rear end of the cylindrical opening of the cylindrical holder 431.

The partition section 44 is provided at a predetermined position to place a partition between a space in which the components of the phototransmitter 10 are located and a space in which the components of the photoreceiver 30 are located. To the partition section 44, the transmitted-light reflection mirror 15, received light deflection mirror 33, and light reception lens 32 are assembled thereto.

The light reception board 51 and the pair of light transmission boards 53 and 54 are mounted to the frame 40 with screws. That is, adjusting at least one of the location and angle of the light reception board 51 with screws allows at least one of the location and angle of the light reception device 31 to be finely adjusted three-dimensionally. Similarly, adjusting at least one of the location and angle of each of the light emission boards 53 and 54 allows at least one of the location and angle of the corresponding one of the light sources 11 and 12 to be finely adjusted three-dimensionally.

The holder 421 is integrated with the frame side section 4, but may be integrated with the light emission board 53. The holder 431 is integrated with the frame rear section 43, but may be integrated with the light emission board 54.

[2. Control]

A control device 110 is for example installed in the housing 100 of the lidar device 1 (see FIG. 17). The control device 110 is configured to control the time when each of the light sources 11 and 12 emits corresponding light beams in synchronization with rotation of the mirror module 21 of the scanner 20. Specifically, this control causes the light source 11 to emit the light beams so that the emitted light beams enter the deflection mirror 211, and causes the light source 12 to emit the light beams so that the emitted light beams enter the deflection mirror 212.

[3. Operation]

As illustrated in FIG. 8, each light beam transmitted from the light source 11 passes through the light transmission lens 13 and thereafter reaches the corresponding reflection spot P on one of the reflection surfaces of the transmitted-light deflector 20a. Additionally, each light beam transmitted from the light source 12 passes through the light transmission lens 14 and is deflected by the transmitted-light deflection mirror 15 at a substantially right angle. The light beam deflected by the mirror 15a thereafter travels to enter the corresponding reflection spot P on the other of the reflection surfaces of the transmitted-light deflection unit 20a.

The light beams incident on the transmitted-light deflection unit 20a are each transmitted in a corresponding direction determined by the rotational position of the mirror module 21.

As illustrated in FIG. 9, reflected light beams from a detection target located in a predetermined direction dependent on the rotational position of the mirror module 21 arrive at the received-light detection unit 20b as arrival light beams. The arrival light beams are each reflected by the received-light deflection unit 20b so as to be deflected thereby. The deflected light beams are thereafter received by the light reception device 31 via the light reception lens 32 and the received light deflection mirror 33. The predetermined direction dependent on the rotational position of the mirror module 21 refers to a direction of a light beam emitted from the transmitted-light deflection unit 20a.

That is, the lidar device 1 is configured to rotate the mirror module 21 to thereby mechanically perform the horizontal scanning, i.e. the main scanning, of the laser beams.

In addition, the lidar device 1 is configured to control the light sources 11 and 12 that transmit the four light beams aligned in the vertical direction while controlling the APD array 31, thus electronically performing the vertical scanning, i.e. the sub scanning, of the laser beams.

[4. Positional Adjustment of the Light Sources and the Light Reception Device]

Figure 10:
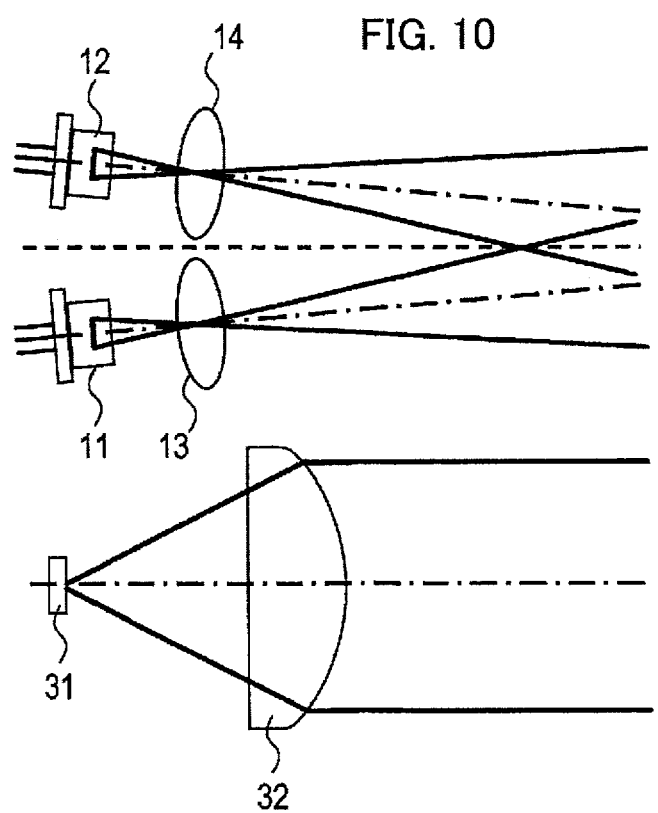
FIG. 10 is a view illustrating how positions of the optical source and light reception device are adjusted.

As illustrated in FIGS. 8 to 10, the light sources 11 and 12 are arranged such that 1. The light path length of each light beam from the light source 11 to the corresponding reflection spot P of the transmitted-light deflector 20a is identical to the light path length of each light beam from the light source 12 to the corresponding reflection spot P of the transmitted-light deflector 20a 2. The optical axes of the respective light beams from the light source 11 substantially intersect with each other at the corresponding reflection spot P The light reception device 31 is arranged at a predetermined region including a focal point of the light reception lens 32.

The following defines the light beam emitted from the light emitting area A1 of the light source 11 as a light beam B11, the light beam emitted from the light emitting area A2 of the light source 11 as a light beam B12, the light beam emitted from the light emitting area A1 of the light source 12 as a light beam B21, and the light beam emitted from the light emitting area A2 of the light source 12 as a light beam B22.

Figure 11:
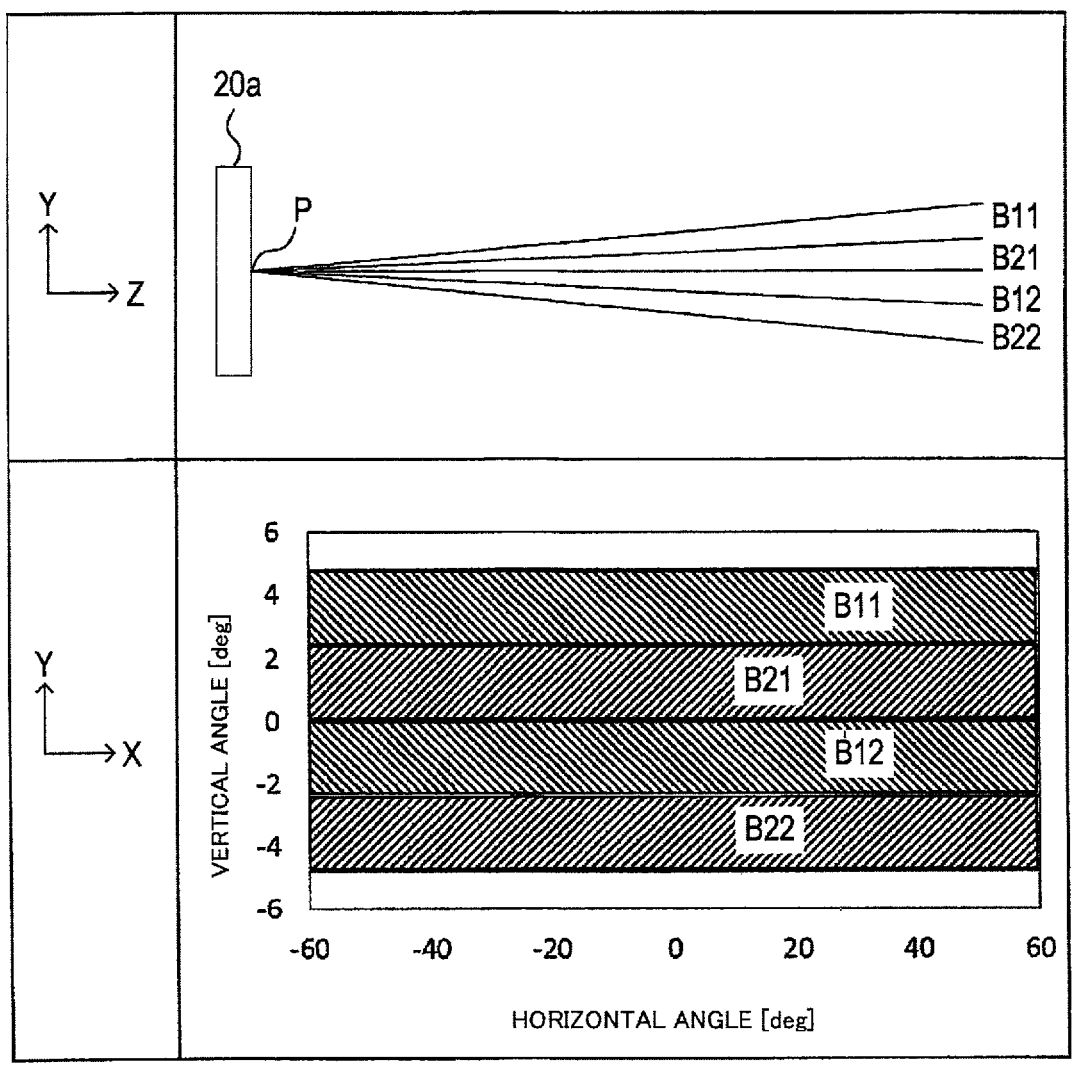
FIG. 11 is a diagram illustrating an irradiation range of a light beam irradiated from a deflection mirror.

As illustrated in FIG. 11, the light beams B11 and B12 deflected from the corresponding reflection spot P of the transmitted-light deflector 20a and the light beams B21 and B22 deflected from the corresponding reflection spot P of the transmitted-light deflector 20a are aligned along a Y-Z plane defined by the Y-axis direction and the Z-axis such that 1. The light beam B21 based on the light source 12 is located in a gap between the light beams B11 and B12 based on the light source 11

2. The light beam B12 based on the light source 11 is located in a gap between the light beams B21 and B22 based on the light source 12

In particular, fine adjustment of the position of each of the light sources 11 and 12 enables the light beams B11, B21, B12, and B22 to be aligned without no gaps therebetween.

Figure 12:
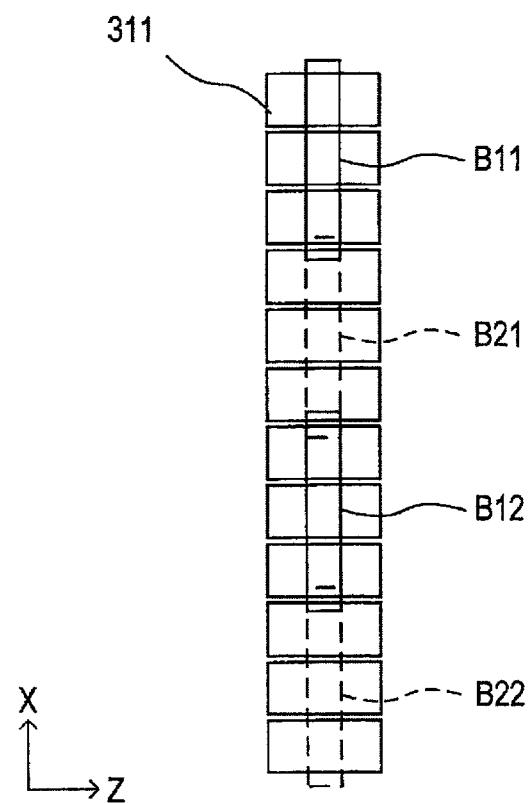
FIG. 12 is a diagram illustrating a relationship between light sources and a light receiving area of the light reception device.

Referring to FIG. 12, a reflection light beam generated based on reflection of each of the light beams B11, B21, B12, and B22 is irradiated on the APD array 31 as a received light beam such that the reflection light beam corresponding to each of the light beams B11, B21, B12, and B22 is incident on the center portions of corresponding APDs of the APD array 31 in the Z-axis direction.

In particular, referring to FIG. 12, the received light beam corresponding to the light beam B11 is irradiated on a first set of corresponding three APDs in the APD array 31, and the received light beam corresponding to the light beam B21 is irradiated on a second set of corresponding three APDs in the APD array 31. Similarly, the received light beam corresponding to the light beam B12 is irradiated on a third set of corresponding three APDs in the APD array 31, and the received light beam corresponding to the light beam B22 is irradiated on a fourth set of corresponding three APDs in the APD array 31. The three APDs of the first set, the three APDs of the second set, the three APDs of the third set, and the three APDs of the fourth set are different from one another.

The reflection surfaces of the transmitted-light deflector 20a are arranged to be parallel to the rotational axis of the mirror module 21. For this reason, an inclination angle of the optical axis of each light beam, which is deflected from the corresponding reflection surface of the transmitted-light deflector 20a, to the corresponding reflection surface along a vertical plane becomes constant independently of any rotational position of the mirror module 21; the vertical plane includes an incident path of the corresponding light beam on the corresponding reflection surface along the Y-axis direction.

That is, as illustrated by a graph in FIG. 11, an output angle, i.e. a vertical angle, of each of the light beams B11, B21, B12, and B22 outputted from the transmitted-light deflector 20a in the Y-axis direction corresponding to the sub-scanning direction becomes constant independently of an output angle, i.e. a horizontal angle, of the corresponding one of the light beams B11, B21, B12, and B22 outputted from the transmitted-light deflector 20a in the X-axis direction corresponding to the main-scanning direction.

This enables the light beams to be irradiated in the two-dimensionally defined scanning region without any gaps therebetween.

Figure 13:
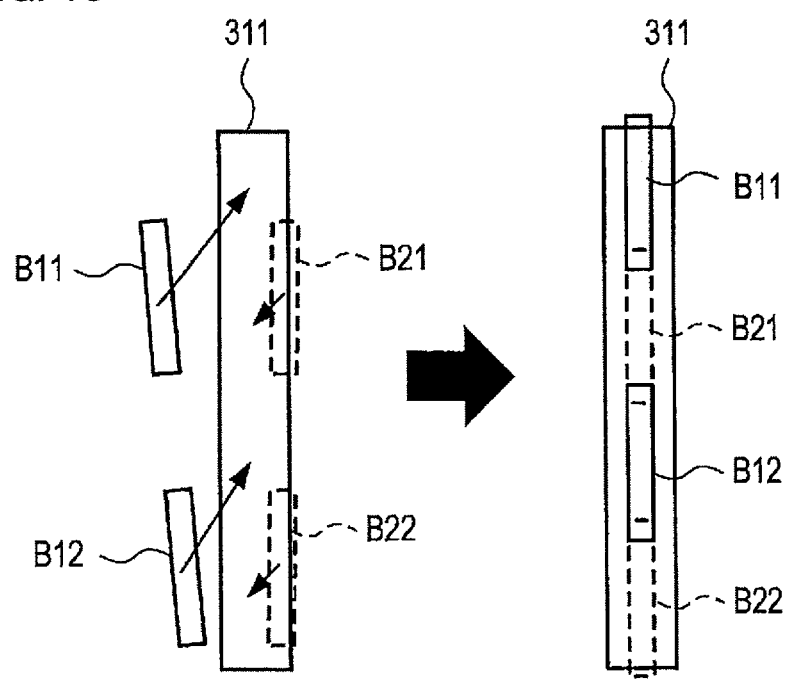
FIG. 13 is a diagram illustrating an example of adjustment of positions of the respective light sources.

FIG. 13 illustrates a first example of the relationship between the APD array 311 of the light reception device 31 and the received light beams before fine adjustment of the position of the light sources 11 and 12, and a second example of the relationship between the APD array 311 of the light reception device 31 and the received light beams after fine adjustment of the position of the light sources 11 and 12.

Adjustment of the position of the light source 11 enables the irradiated positions of the received light beams respectively corresponding to the light beams B11 and B12 to be changed integrally as one piece. Similarly, adjustment of the position of the light source 12 enables the irradiated positions of the received light beams respectively corresponding to the light beams B21 and B22 to be changed integrally as one piece.

Additionally, the light beams B11 and B12 are incident on the deflection mirror 211 and the light beams B21 and B22 are incident on the deflection mirror 212, which is different from the deflection mirror 211. This enables adjustment of the position of the received light beams based on the respective light beams B11 and B12 from the light source 11 to be performed independently, and adjustment of the position of the received light beams based on the respective light beams B21 and B22 from the light source 12 to be performed independently. The position of the light reception device 31 can be adjusted to enable the amount of positional adjustment of the light sources 11 and 12 to be minimized and/or enable adjustment of only one of the light sources 11 and 12 to be performed.

[5. Advantageous Effects]

The lidar device 1 described in detail above achieves the following advantages effects.

(5a) The lidar device 1 includes the scanner 20, and the scanner 20 includes the deflection mirrors 211 and 212 that respectively serve as reflection surfaces of the scanner 20. The deflection mirrors 211 and 212 are each arranged to be parallel to the axial direction of the rotational axis of the motor 23. This configuration of the lidar device 1 maintains the output angle, i.e. the vertical angle, of each light beam in the sub scanning direction to be constant, making it possible to irradiate the two-dimensionally defined scanning region with the light beams without any gaps therebetween.

The lidar device 1 keeps unchanged the output angle of each of the light beams in the sub scanning direction independently of the incident position of a corresponding one of incident light beams on the transmitted-light deflector 20a, making it easier to control the incident position of each of the incident light beams on the transmitted-light deflector 20a as compared with conventional lidar devices.

(5b) The light sources 11 and 12 of the phototransmitter 10 included in the lidar device 1 respectively have the optical axes, and the optical axis of each of the light sources 11 and 12 is arranged to be obliquely inclined with respect to the reference surfaces of the transmitted-light deflector 20a. In particular, the transmitted-light deflection mirror 15 is configured to deflect the path of each light beam transmitted form the light source 12 to the transmitted-light deflector 20a. This enables the light sources 11 and 12 to be located such that the light beams transmitted from the respective light sources 11 and 12 are overlapped with each other in the Y-axis direction, resulting in the size of the lidar device 1 in the Y-axis direction to be smaller.

(5c) The lidar device 1 is configured to
1. Control the light source 11 to thereby perform transmission of the light beams emitted from the light source 11, and reception of reflected light beams
2. Control the light source 12 to thereby perform transmission of the light beams emitted from the light source 12, and reception of reflected light beams This configuration enables the first relationship between the light reception device 31 and the received reflected light beams for the light source 11 and the second relationship between the light reception device 31 and the received reflected light beams for the light source 12 to be individually adjusted even if the reflection surfaces of the respective deflection mirrors 211 and 212 have been slightly obliquely inclined with respect to the rotational axis of the motor 23 due to, for example, manufacturing tolerances of the mirrors 211 and 212.

(5d) The lidar device 1 has a smaller size and a configuration that enables various adjustments to be easily performed, resulting in a higher mountable feature. This makes it possible to provide the cruise assist system 70, which includes the lidar device 1, having a smaller system size and a simpler configuration. Similarly, this makes it possible to provide the vehicle 60, which includes the lidar device 1, having a smaller size and a simpler configuration.

[6. Modifications]

The present embodiment according to the present disclosure has now been described. The present disclosure is however not limited to the present embodiment described above, and various modifications can be made thereto.

Figure 14:
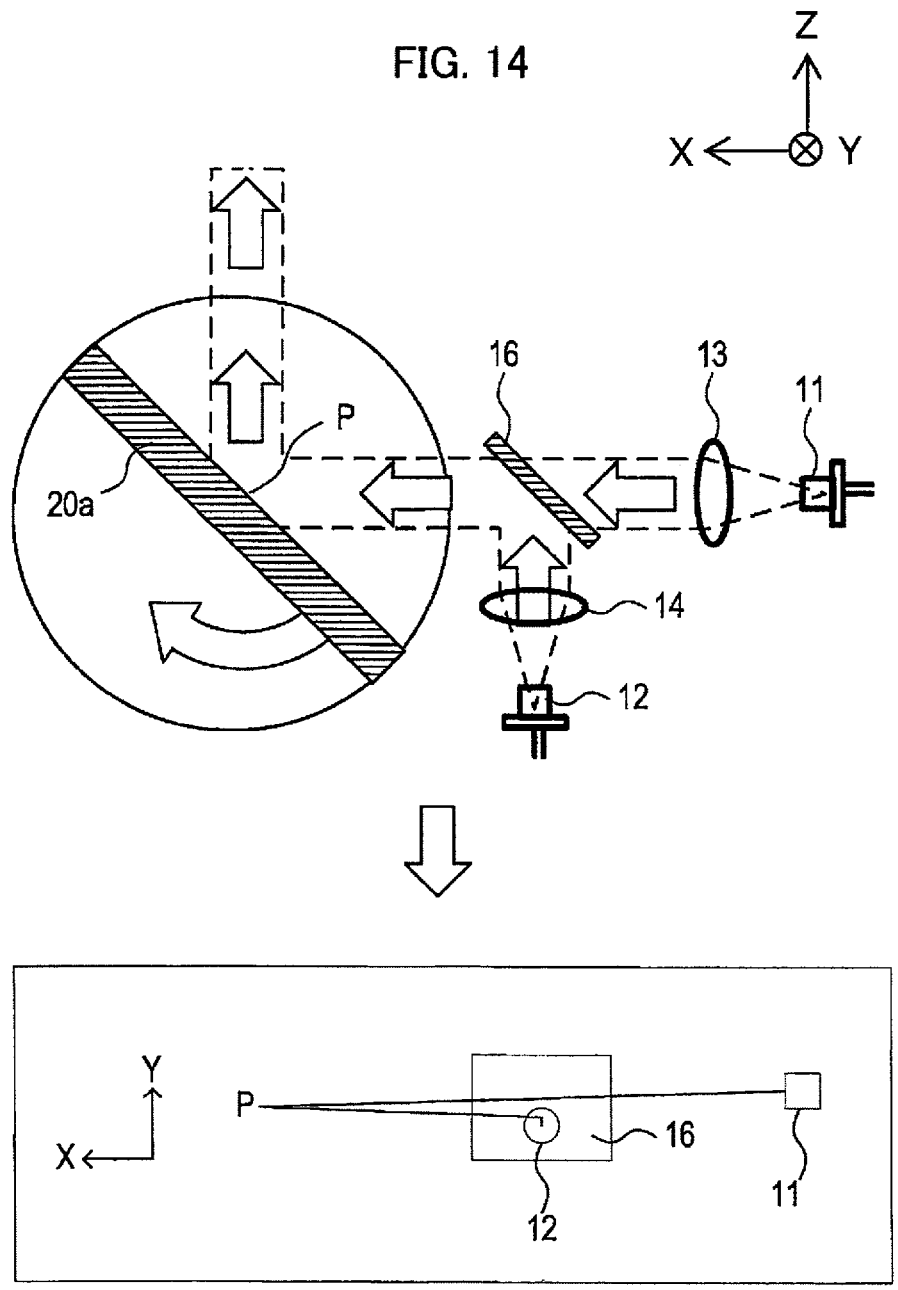
FIG. 14 is a diagram illustrating a modification of a phototransmitter.

The positions of the light sources 11 and 12 in the Y-axis direction according to the present embodiment are determined to prevent the transmitted-light deflection mirror 15 from interrupting the path of each light beam from the light source 11, but the present disclosure is not limited thereto. For example, as illustrated in FIG. 14, a polarization beam splitter 16 can be provided in place of the transmitted-light deflection mirror 15. In this modification, the light source 11 is configured to transmit the light beams each having a predetermined first polarization direction, and the light source 12 is configured to transmit the light beams each having a predetermined second polarization direction; the first and second polarization directions have a difference of 90 degrees from each other.

Figure 15:
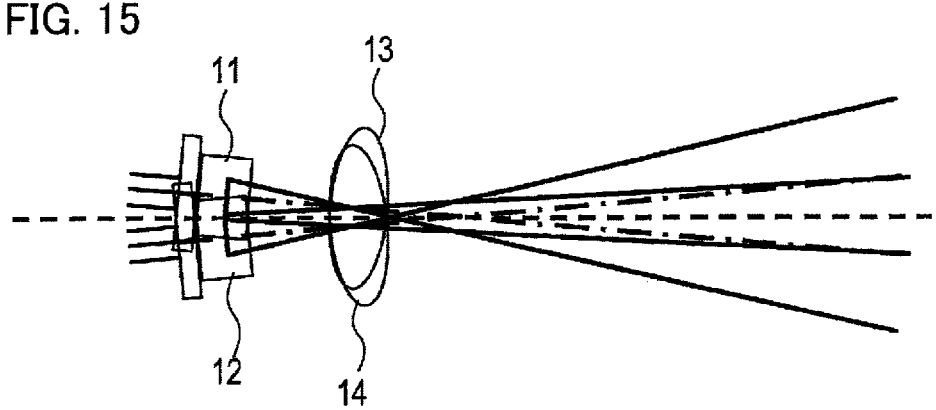
FIG. 15 is a view illustrating positions of respective light sources according to the modification illustrated in FIG. 14.

That is, the polarization beam splitter 16 is arranged to enable the light beams transmitted from the light source 11 therethrough while reflect the light beams transmitted from the light source 12. In other words, the polarization beam splitter 16 can be arranged on the paths of the respective light beams from the light sourced 11 to the reflection spot P. This enables, as illustrated in FIG. 15, the position of the light source 11 and the position of the light source 12 in the Y-axis direction to be substantially identical to each other, resulting in the size of the lidar device 1 being smaller in the Y-axis direction.

The light sources 11 and 12 can be configured to output the light beams that have the same polarization direction, and a wavelength plate can be used to change one of the light beams outputted from the light sources 11 and 12. The polarization beam splitter 16 is an example of an optical device.

(6b) The present embodiment uses the two light sources, but the number of the light sources can be set to three or more. The light emitting areas of each of at least two light sources have an interval therebetween and are arranged to satisfy the following equation:

$$(M-1) \times L \geq S$$

where:
M represents the number of the at least two light sources;
L represents the width of each of the light emitting areas in each of the at least two light sources; and
S represents the interval between the light emitting areas.

(6c) The present embodiment uses, as the light sources 11 and 12, multistrip semiconductor lasers, each of which has the two light emitting areas A1 and A2, but the present disclosure is not limited thereto.

Figure 16:
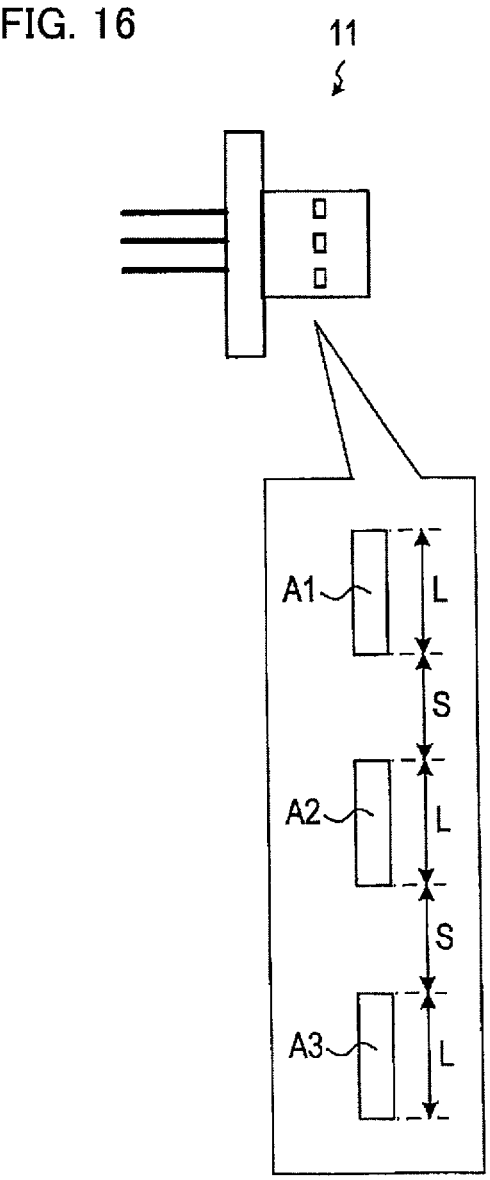
FIG. 16 is a diagram illustrating a modification of a light source.

For example, as illustrated in FIG. 16, the present disclosure can use, as each of the light sources 11 and 12, a multistrip laser having three light emitting areas A1 to A3. In this modification, like the present embodiment, the light emitting areas A1 to A3 can be arranged to satisfy the following equation:

$$L \geq S$$

where:
L represents the width of each of the light emitting areas A1 to A3; and
S represents intervals between the light emitting areas A1 to A3.

A certain level of the value (L−S) can be ensured in order to prevent the occurrence of gaps due to production error.

(6d) The light sources 11 and 12 are arranged such that their optical axes intersect with each other, but can be arranged such that their optical axes are separated from each other while extending from the light sources 11 and 12.

(6e) The scanner 20 of the present embodiment includes the two deflection mirrors 211 and 212, but can include at least three deflection mirrors. The scanner 20 of the present embodiment includes the transmitted-light deflector 20a and the received-light deflector 20b on the same deflection mirror module, but can include the transmitted-light deflector 20a and the received-light deflector 20b on respective different mirror modules.

(6f) A plurality of functions of one component in the above embodiment may be implemented by a plurality of components, and one function of one component may be implemented by a plurality of components. A plurality of components of a plurality of components may be implemented by one component, and one function implemented by a plurality of components may be implemented by one component. Part of the configuration in the above embodiment may be eliminated. Part of the configuration of the above embodiment may be added to or replaced with part of a configuration of at least one of the modifications.

What is claimed is:

1. A lidar device comprising:
a phototransmitter including at least first and second light sources, each of the first and second light sources being configured to transmit a light beam having an optical axis, each of the first and second light sources having at least two light emitting areas, each of the at least two light emitting areas of the first light source transmitting, as the light beam, a first light beam, each of the at least two light emitting areas of the second light source transmitting, as the light beam, a second light beam;
a photoreceiver configured to receive light arriving from a predetermined direction;
a scanner that has a rotational axis and a plurality of reflection surfaces that are parallel to a direction of the rotational axis,
the scanner being configured to rotate the plurality of reflection surfaces about the rotational axis to thereby:
change a direction of each of the first and second light beams transmitted from the phototransmitter and incident on the scanner to thereby output changed light beams in a main scanning direction that is orthogonal to the direction of the rotational axis; and
reflect light beams arriving from a target object based on reflection of the changed light beams to thereby cause the light beams to be directed toward the photoreceiver,
the first and second light sources being arranged such that the optical axis of at least one of the first and second light beams transmitted from the first and second light sources is obliquely inclined with respect to a reference plane that is orthogonal to the rotational axis,
the first light beams transmitted from the first light source having gaps therebetween,
at least one of the second light beams transmitted from the second light source being arranged to cover a corresponding at least one of the gaps.

2. A lidar device comprising:
a phototransmitter including at least first and second light sources, each of the first and second light sources being configured to transmit a light beam having an optical axis;
a photoreceiver configured to receive light arriving from a predetermined direction;
a scanner that has a rotational axis and a plurality of reflection surfaces that are parallel to a direction of the rotational axis,
the scanner being configured to rotate the plurality of reflection surfaces about the rotational axis to thereby:
change a direction of each of the light beams transmitted from the phototransmitter and incident on the scanner to thereby output changed light beams in a main scanning direction that is orthogonal to the direction of the rotational axis; and
reflect light beams arriving from a target object based on reflection of the changed light beams to thereby cause the light beams to be directed toward the photoreceiver,
the first and second light sources being arranged such that the optical axis of at least one of the light beams transmitted from the first and second light sources is obliquely inclined with respect to a reference plane that is orthogonal to the rotational axis,
the lidar device further comprising a control device configured to cause each of the first and second light sources to transmit, in synchronization with rotation of the scanner, the light beam so that the transmitted light beam from each of the first and second light sources is incident on a corresponding one of the plurality of reflection surfaces.

3. The lidar device according to claim 2, further comprising:
a first light deflector mounted to each of the plurality of reflection surfaces and configured to enable the light beams transmitted from the phototransmitter to be incident thereon; and
a second light deflector mounted to each of the plurality of reflection surfaces and configured to enable the light beams reflected from the target object to be incident thereon.

4. The lidar device according to claim 2, wherein:
the optical axes of the light beams from the first and second light sources are obliquely inclined by different angles with respect to the reference plane, respectively.

5. The lidar device according to claim 4, wherein:
the optical axis of the light beam from one of the first and second light sources intersects with the optical axis of the light beam of the other of the first and second light sources.

6. The lidar device according to claim 4, wherein:
the optical axis of the light beam from one of the first and second light sources is directed to be symmetrical with the optical axis of the light beam from the other of the first and second light sources.

7. The lidar device according to claim 4, wherein:
the phototransmitter further includes at least one optical device disposed between the scanner and the first and second light sources,
the at least one optical device being configured to reflect the light beams transmitted from the respective first and second light sources so that a path of each of the reflected light beams is changed from a path of a corresponding one of the light beams transmitted from the respective first and second light sources.

8. The lidar device according to claim 4, wherein:
the first and second light sources are configured to respectively transmit the light beams that have different polarization directions from each other; and
the phototransmitter further includes at least one optical device disposed between the scanner and the first and second light sources,
the at least one optical device being configured to:
  enable one or more light beams each having a predetermined first polarization direction to be passed therethrough; and
  reflect one or more light beams each having a predetermined second polarization direction.

9. The lidar device according to claim 2, wherein:
the first and second light sources are arranged at different positions in the direction of the rotational axis.

10. The lidar device according to claim 2, wherein:
the phototransmitter further includes first and second adjustment devices provided for the respective first and second light sources,
the light beam transmitted from each of the first and second light sources has a diameter and a traveling direction; and
each of the first and second adjustment devices being configured to enable the light beam transmitted from the corresponding one of the first and second light sources to be passed therethrough while optically changing at least one of the diameter and the traveling direction of the light beam transmitted from the corresponding one of the first and second light sources in accordance with a position of the corresponding one of the first and second adjustment devices relative to the corresponding one of the first and second light sources.

11. A lidar device comprising:
a phototransmitter including at least first and second light sources, each of the first and second light sources being configured to transmit a light beam having an optical axis;
a photoreceiver configured to receive light arriving from a predetermined direction;
a scanner that has a rotational axis and a plurality of reflection surfaces that are parallel to a direction of the rotational axis,
the scanner being configured to rotate the plurality of reflection surfaces about the rotational axis to thereby:
  change a direction of each of the light beams transmitted from the phototransmitter and incident on the scanner to thereby output changed light beams in a main scanning direction that is orthogonal to the direction of the rotational axis; and
  reflect light beams arriving from a target object based on reflection of the changed light beams to thereby cause the light beams to be directed toward the photoreceiver,
the first and second light sources being arranged such that the optical axis of at least one of the light beams transmitted from the first and second light sources is obliquely inclined with respect to a reference plane that is orthogonal to the rotational axis,
wherein
each of the first and second light sources is a semiconductor laser including at least two light emitting areas that are aligned along a predetermined alignment direction;
each of the first and second light sources has a width in the alignment direction;
the at least two light emitting areas of each of the first and second light sources have an interval therebetween and are arranged to satisfy the following equation:

$$(M-1) \times L \geq S$$

where:
  M represents the number of the at least first and second light sources;
  L represents the width of each of the at least two light emitting areas; and
  S represents the interval between the at least two light emitting areas;
the at least two light emitting areas of each of the first and second light sources are configured to respectively emit light beams as the light beam transmitted from the corresponding one of the first and second light sources while the light beams have a gap therebetween; and
the first and second light sources are arranged such that:
  one of the light beams from the at least two light emitting areas of the first light source is located in the gap between the light beams emitted from the at least two light emitting areas of the second light source.

12. A cruise assist system comprising:
a lidar device comprising:
a phototransmitter including at least first and second light sources, each of the first and second light sources being configured to transmit a light beam having an optical axis, each of the first and second light sources having at least two light emitting areas, each of the at least two light emitting areas of the first light source transmitting, as the light beam, a first light beam, each of the at least two light emitting areas of the second light source transmitting, as the light beam, a second light beam;
a photoreceiver configured to receive light arriving from a predetermined direction;
a scanner that has a rotational axis and a plurality of reflection surfaces that are parallel to a direction of the rotational axis, the scanner being configured to:
  rotate the plurality of reflection surfaces about the rotational axis;
  change a direction of each of the first and second light beams transmitted from the phototransmitter and incident on the scanner to thereby output changed light beams in a main scanning direction that is orthogonal to the direction of the rotational axis; and reflect light beams arriving from a target object based on reflection of the changed light beams to thereby cause the light beams to be directed toward the photoreceiver, the first and second light sources being arranged such that the optical axis of at least one of the first and second light beams transmitted from the first and second light sources is obliquely inclined with respect to a reference plane that is orthogonal to the rotational axis, the first light beams transmitted from the first light source having gaps therebetween, at least one of the second light beams transmitted from the second light source being arranged to cover a corresponding at least one of the gaps.

13. A vehicle comprising a lidar device installed therein, the lidar device comprising:

a phototransmitter including at least first and second light sources, each of the first and second light sources being configured to transmit a light beam having an optical axis, each of the first and second light sources having at least two light emitting areas, each of the at least two light emitting areas of the first light source transmitting, as the light beam, a first light beam, each of the at least two light emitting areas of the second light source transmitting, as the light beam, a second light beam;

a photoreceiver configured to receive light arriving from a predetermined direction;

a scanner that has a rotational axis and a plurality of reflection surfaces that are parallel to a direction of the rotational axis, the scanner being configured to rotate the plurality of reflection surfaces about the rotational axis to thereby:

change a direction of each of the first and second light beams transmitted from the phototransmitter and incident on the scanner to thereby output changed light beams in a main scanning direction that is orthogonal to the direction of the rotational axis; and reflect light beams arriving from a target object based on reflection of the changed light beams to thereby cause the light beams to be directed toward the photoreceiver, the first and second light sources being arranged such that the optical axis of at least one of the first and second light beams transmitted from the first and second light sources is obliquely inclined with respect to a reference plane that is orthogonal to the rotational axis, the first light beams transmitted from the first light source having gaps therebetween, at least one of the second light beams transmitted from the second light source being arranged to cover a corresponding at least one of the gaps.

* * * * *